United States Patent [19]

Lavoie

[11] Patent Number: 5,039,226

[45] Date of Patent: Aug. 13, 1991

[54] PORTABLE CONCRETE MIXER

[76] Inventor: Gilles Lavoie, 8439 Saroy, Dauville, Quebec, Canada, J0B 1N0

[21] Appl. No.: 396,174

[22] Filed: Aug. 21, 1989

[30] Foreign Application Priority Data

Jun. 28, 1989 [CA] Canada .................................. 604188

[51] Int. Cl.$^5$ .......................... B28C 5/18; B28C 7/16; B60D 1/00; F16D 43/02

[52] U.S. Cl. .................................. 366/44; 192/41 R; 280/490.1; 366/59; 366/60; 366/63

[58] Field of Search ....................... 366/57, 59, 44, 60, 366/62, 63, 54, 55, 56, 58, 218, 225, 226, 227, 228, 229, 230, 231, 233; 280/504, 400, 414.1, 490.1, 511, 789; 192/41 R, 12 B; 74/575, 578; 414/467, 468

[56] References Cited

U.S. PATENT DOCUMENTS

| | | | |
|---|---|---|---|
| 624,200 | 5/1899 | Fisher | 366/55 X |
| 977,679 | 12/1910 | Robbins | 366/55 X |
| 2,176,874 | 10/1939 | St. John | 366/60 X |
| 2,328,343 | 8/1943 | Jacob | 280/490.1 |
| 2,507,077 | 5/1950 | Williams | 366/60 |
| 2,816,535 | 12/1957 | Sells | 192/41 R X |
| 3,195,362 | 7/1965 | Elston et al. | 74/575 X |
| 3,326,537 | 6/1967 | Wallace | 366/60 X |
| 3,830,522 | 8/1974 | Boucher | 280/490.1 X |
| 3,843,163 | 10/1974 | Hale | 280/490.1 |
| 4,078,263 | 3/1978 | Campbell | 366/228 X |
| 4,387,995 | 6/1983 | Routson | 366/63 X |

*Primary Examiner*—Harvey C. Hornsby
*Assistant Examiner*—Scott J. Haugland
*Attorney, Agent, or Firm*—Wolder, Gross & Bondell

[57] ABSTRACT

A trailer for transporting and mixing concrete or similar products, comprising a wheeled frame and a mixing drum mounted to the wheeled frame for rotation in a first direction for mixing concrete and in a second direction for discharging concrete from the drum. A unidirectional driving connection is provided between a wheel of the frame and the mixing drum for rotating the drum in the concrete mixing direction as a result of movement of the wheeled frame. An electric motor is also provided on the frame for rotating the drum in the concrete discharging direction.

4 Claims, 2 Drawing Sheets

PORTABLE CONCRETE MIXER

FIELD OF THE INVENTION

The present invention relates to the preparation of concrete or similar materials and, more particularly, to a portable apparatus for transporting and mixing concrete well suited for small jobs.

BACKGROUND OF THE INVENTION

The most popular method for transporting and mixing concrete consists of employing large cement trucks adapted to carry and mix subtantial quantities of concrete in the most efficient manner. However, this type of equipment is ill suited for small concrete jobs which are normally carried out by mixing the concrete at the job site either manually or by portable mixers. This process is time consuming because the transport of the cement from the supplier to the job site and the cement mixing operations are performed separately.

Another method to obtain concrete for small applications is to rent a specially designed trailer which is filled with concrete mix at the plant and towed to the construction site. The major problem with this system is that once the trailer has been filled with concrete, the transportation and the pouring operations must be performed rapidly before the concrete hardens. Thus, as a result of an unexpected delay during the transportation, the concrete mix may not longer be usable when arriving at the job site and trailer cleaning problems may arrise.

OBJECTS AND STATEMENT OF THE INVENTION

An object of the invention is to provide a portable concrete mixing and transportation device that is both efficient and inexpensive to build.

Another object of the invention is a portable unit for transporting and mixing concrete with provisions to automatically discharge the concrete mix.

A further object of the invention is a trailer for transporting and mixing concrete with provisions to prevent accidental concrete discharge as a result of changing the direction of movement of the trailer.

The above objects are achieved by providing a trailer to be towed by a suitable vehicle, comprising a wheeled frame and a concrete mixing drum rotatably mounted to the frame. The drum is a generally hollow structure with internal vanes arranged to mix the concrete while the drum rotates into one direction, and to discharge the concrete mix when the drum rotates into the opposite direction.

A unidirectional driving connection between at least one of the trailer wheels and the mixing drum causes rotation thereof in a concrete mixing direction while the trailer advances, but prevents the drum to rotate in a concrete discharge direction when the trailer is moved in an opposite direction. This feature is particularly advantageous because it permits to avoid accidental concrete discharge from the mixing drum when the trailer is moved back.

To conveniently expel the concrete mix from the mixing drum at the construction site, the trailer is provided with a device that will drive the drum into the concrete discharge direction.

In a preferred embodiment, the wheels supporting the trailer frame on the ground surface are mounted to a common axle which also serves as a power take off for the mixing drum. The operative connection between the mixing drum and the axle is effected by means of a gears and drive axles assembly incorporating a suitable ratchet mechanism to prevent rotation of the mixing drum when the trailer is moved back, but rotating the mixing drum when the trailer advances.

To discharge the concrete mix from the drum, an electric motor is provided on the trailer, coupled to the drum through a chain and sprocket assembly, to rotate the latter in a concrete discharge direction.

Therefore, the present invention comprises, in general terms, a trailer for transporting and mixing concrete or similar products, comprising:

a wheeled frame;

a mixing drum mounted to the wheeled frame for rotation in a concrete mixing direction and in a concrete discharging direction;

a unidirectional driving connection between a wheel of the frame and the mixing drum to cause rotation of the mixing drum solely in the concrete mixing direction as a result of movement of the wheeled frame; and selectively actuatable driving means on the frame in operative relationship with the mixing drum for rotating the mixing drum in the drum discharging direction.

Other advantages and objects of the invention will become clear from the following description of a preferred embodiment of this invention.

DESCRIPTION OF A PREFERRED EMBODIMENT

Figure 1:
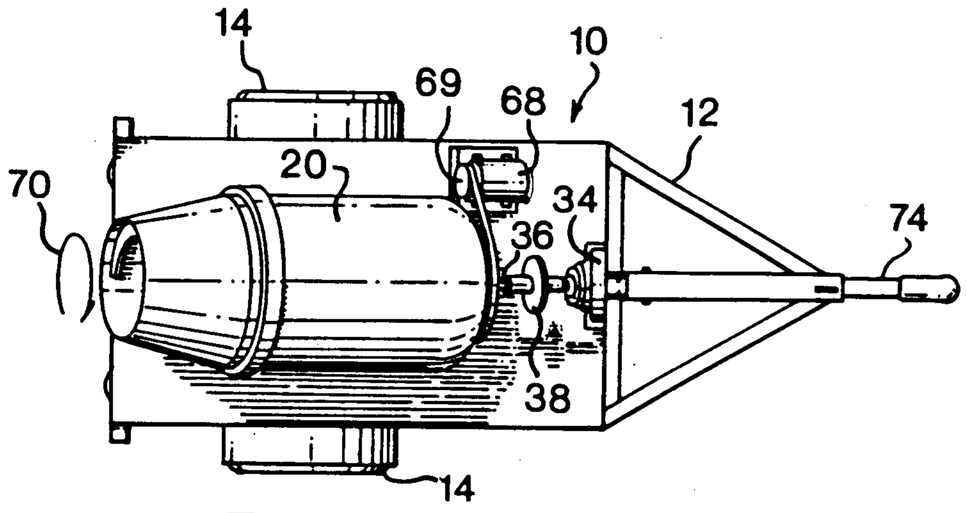
FIG. 1 is a top elevational view of a portable concrete mixing and transportation device constructed in accordance with the invention.
Figure 2:
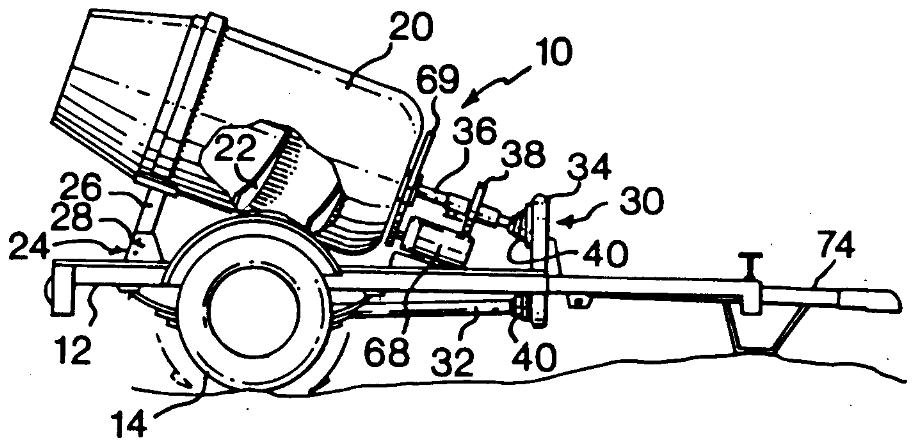
FIG. 2 is a side elevational view, partly sectional of the concrete mixing device.
Figure 3:
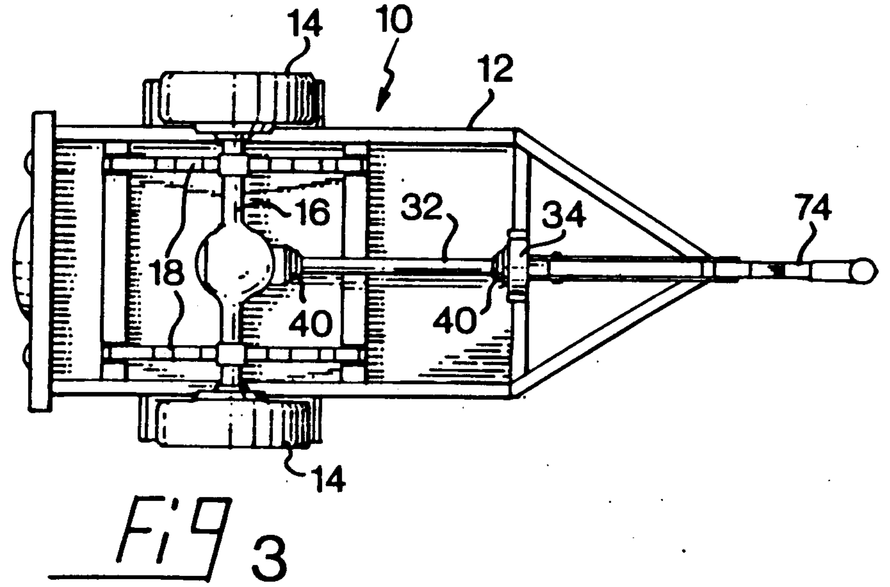
FIG. 3 is a bottom view of the concrete mixing device.

Referring now to the annexed drawings and, more particularly, to FIGS. 1, 2 and 3, the reference numeral 10 designates in general a portable concrete mixing trailer designed to be towed by a car or any other suitable vehicle. The device 10 includes a frame 12 constructed from metallic beams welded or otherwise attached to each other. The frame 12 is supported on the ground by a pair of rubber tired wheels 14 mounted for rotation on a common axle 16. The axle 16 is mounted to the metallic frame 12 by a leaf spring suspension 18.

A concrete mixing drum 20 of a generally conventional construction is mounted on the frame 12. The drum 20 is a generally hollow cylindrical structure with internal mixing vanes 22 extending spirally along the longitudinal axis of the drum.

A supporting structure 24 is mounted at the rear of the frame 12 for holding the drum 20 at an angle with respect to the horizontal position. More particularly, the supporting structure 24 includes an upwardly extending post 26, secured to the frame 12 by means of a bracket 28, and carrying at its upper end a pair of rollers 29 (only one being shown) engaging the surface of the drum 20 to the frame 12.

If desired, a concrete discharging chute may be provided (not-shown) on the frame 12, below the mouth of the drum 20.

The drum 20 is driven from the wheels 14 by a transmission 30 including an input shaft 32 interconnecting the axle assembly 16 and a transfer case 34. From the transfer case 34 extends an output shaft 36 connected to the drum 20. The shaft 36 incorporates a ratchet mechanism 38 to enable a uni-directional power transfer as it will be described hereinafter.

The connections between the drive shafts 32, 36, the transfer case 34 and the axle assembly 16 are made means of universal joints covered by rubber boots 40 to seal against dirt or other foreign material.

Figure 6:
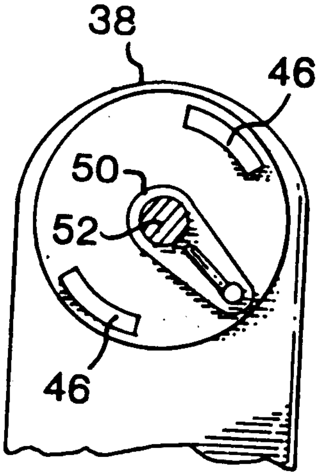
FIG. 6 is a cross-sectional view taken along lines 6—6 in FIG. 5.
Figure 5:
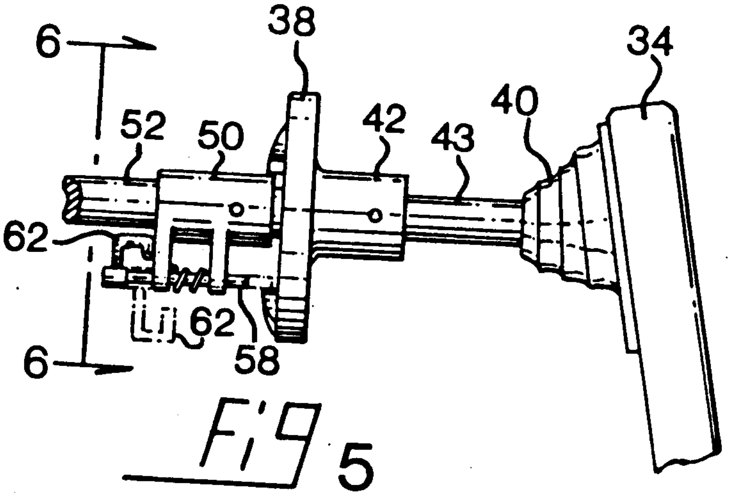
FIG. 5 is a side elevational view of the ratchet mechanism shown in FIG. 4.
Figure 4:
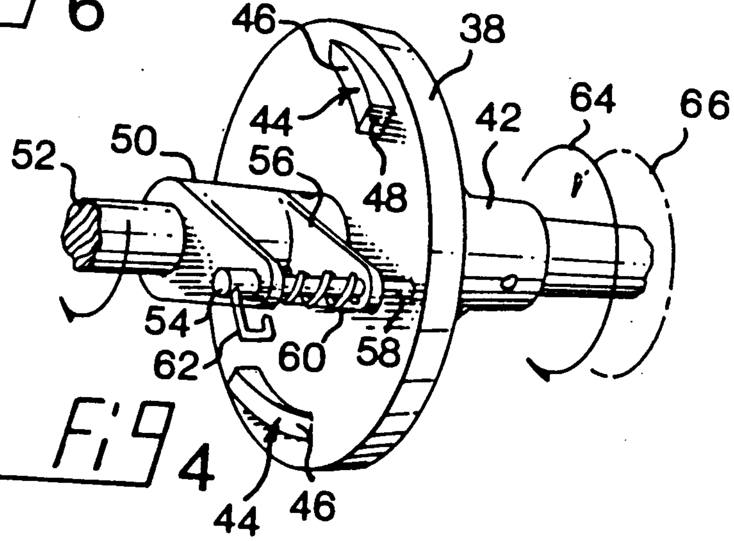
FIG. 4 is an enlarged perspective view of a ratchet mechanism used with the device in accordance with the invention.

The structure of the ratchet mechanism 38 is best illustrated in FIGS. 4, 5 and 6.

The ratchet mechanism 38 comprises a circular plate 42 co-axial to a shaft 43 extending from the transfer case 34. On the plate 42 are provided two cams 44 at spaced locations from each other. Each cam 44 comprises a ramp 46 terminating by an abutment 48.

A collar 50 is secured to one end of a shaft 52 co-axial with the shaft 43 and leading to the mixing drum 20. The extremity of the collar 50, facing the plate 42, is provided with a socket of a generally cylindrical configuration (not shown) rotatably receiving a closely conforming pin (not shown) projecting from the plate 42. This arrangement allows to provide rotatable connection between the collar 50 and the plate 42.

From the collar 50 project laterally two flanges 54 and 56 drilled to slidingly accept a pin 58 receiving a coil spring 60 maintained captive between the flanges 54 and 56. The extremity of the coil spring 60 adjacent the flange 56 is secured by any appropriate means to the pin 58 so as to urge the same toward the circular plate 42. The extremity of the pin 58 opposite the plate 42 comprises a locking tab 62 for retracting the pin 58 from its position shown in FIG. 4. The two possible pin positions are best illustrated in FIG. 5. In full lines, the pin 58 is shown retracted, the locking tab 62 abutting on the flange 54. In dashed lines, the locking tab 62 is rotated so as to clear the flange 54 allowing the pin to extend closer toward the circular plate 42.

The operation of the ratchet mechanism 38 is as follows. Assuming that the pin 58 is in the position shown in FIG. 4 and the driving shaft 44 is rotated in the direction indicated by the arrow 64, the flat circular plate 42 will rotate with respect to the collar 50 until the abutment 48 on one of the cams 44 engages the pin 58 causing rotation of the collar 50, the shaft 52 and consequently the drum 20 about its longitudinal axis. However, if the drive shaft 44 rotates in the opposite direction, as shown by the arrow 66, the pin 58 will engage the cams 44 by the ramps 46 thereof, which will cause the pin 58 to reciprocate between the flanges 54 and 56 without rotating the collar 50.

If the locking tab 62 is raised and placed against the flange 54, no driving engagement can be produced between the circular plate 42 and the collar 50 regardless of the direction of rotation of the driving shaft 43.

Referring back to FIGS. 1 and 2, an electric motor 68 is mounted on the frame 12 to drive the mixing drum 20 for rotation about its longitudinal axis in the direction shown by the arrow 70 in FIG. 1, to discharge the concrete mix therefrom. Power transfer from the motor 68 to the drum 20 is carried out through sprockets and a chain assembly 69. If desired, a reductor gear may also be used with the motor 68 to obtain the desired speed of rotation of the drum 20.

Figure 7:
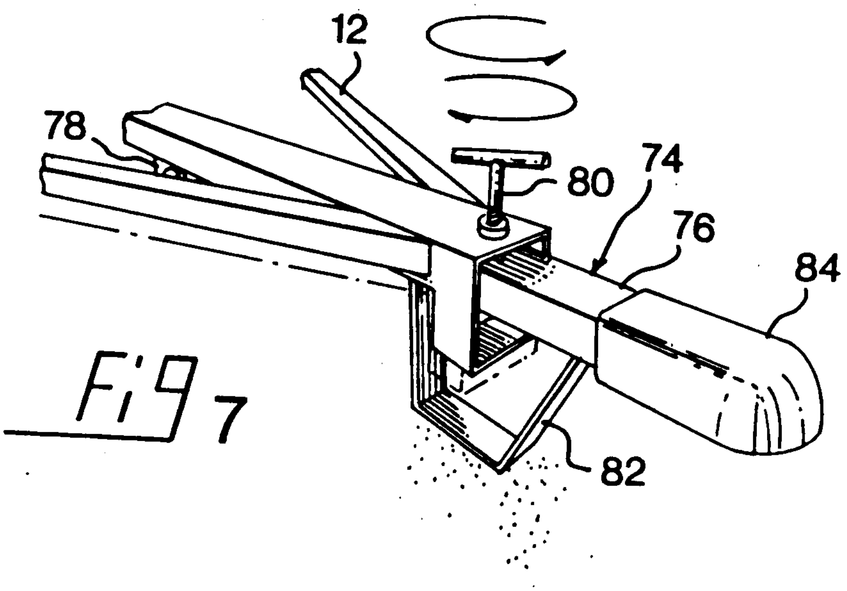
FIG. 7 is a perspective view of a hitch unit and levelling mechanism for the concrete mixing and transportation device.

To connect the wheeled frame 12 to a pulling vehicle, a hitch and leveling assembly 74 is provided. As best illustrated in FIG. 7, the assembly 74 comprises an elongated arm 76 pivotally mounted to the frame 12 at 78. A rod 80 treadedly mounted to the frame 12 engages the arm 76 so as to adjust its angular position with respect to the frame 12.

From the arm 76 projects downwardly a supporting member 82 in the form of an angular bracket which engages the ground when the trailer 12 is disconnected from the vehicle. It will be appreciated that rotating the rod 80 in the appropriate direction, allows to adjust the angular position of the frame 12 as desired.

The free extremity of the arm 76 is provided with a hitch unit 84 of conventional construction to effect the connection to the pulling vehicle.

The operation of the device 10 is as follows. The appropriate amount of cement, water or other suitable material, is placed in the drum 20 and the hitch 74 is connected to the pulling vehicle. The vehicle is then driven at normal operating speeds to the job site. During the travel, the rotation of the wheels 14 will drive the mixing drum 20 in the direction shown by the arrow 64, through the transmission 30, whereby the cement will be mixed and contained in the drum by the vanes 22.

If for whatever reason, the device 10 is moved back, the ratchet 38 will disengage the shaft 52 from the shaft 43 to prevent rotation of the drum 20 in a concrete discharge direction.

When the trailer is located where desired and the angular position of the frame 12 properly adjusted by means of the rod 80, the pin 58 of the ratchet mechanism is placed into a retracted position to prevent any driving engagement between the drum 20 and the wheels 14, and the electric motor 68 is connected into an electrical outlet so as to drive the drum 20 in a concrete discharging direction shown by the arrow 70. It will be appreciated that failure to completely deactivate the ratchet 38 will result into movement of the trailer 10 produced by the electric motor 68 driving the wheels 14 through the transmission normally used to rotate the drum 20.

It is understood that the above description of a preferred embodiment should not be interpreted in any limiting manner because many variations and refinements are possible without departing from the spirit of the invention. The scope of the invention is defined in the annexed claims.

I claim:

1. A trailer for transporting and mixing concrete or similar products, comprising:

wheeled frame;

a mixing drum mounted to said wheeled frame for rotation in a first direction for mixing concrete and in a second direction for discharging concrete from said drum;

a unidirectional driving connection between a wheel of said frame and said mixing drum to cause rotation of said mixing drum solely in said first direction as a result of movement of said wheeled frame; and selectively actuatable driving means on said frame in operative relationship with said mixing drum for rotating said mixing drum in said second direction.

2. A trailer as defined in claim 1, further including means to prevent a driving engagement between said driving means and a wheel of said wheeled frame during the operation of said driving means.

3. A trailer as defined in claim 1, including:

transmission means between said wheel and said mixing drum; and ratchet means in said transmission means to allow for power transfer from said wheel to said mixing drum only when said wheeled frame moves in a predetermined direction.

4. A trailer as defined in claim 3, wherein said drive means include an electric motor.

* * * * *